United States Patent
Schauer et al.

(10) Patent No.: US 6,586,968 B1
(45) Date of Patent: Jul. 1, 2003

(54) PROGRAMMABLE BIT ORDERING FOR SERIAL PORT

(75) Inventors: Steven A. Schauer, Loveland, CO (US); David L. Schell, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/023,742

(22) Filed: Dec. 19, 2001

(51) Int. Cl.[7] .................. H03K 19/175; G06F 13/00
(52) U.S. Cl. .................. 326/86; 326/90; 710/107; 710/109; 710/110
(58) Field of Search .................. 326/86, 90; 710/107, 710/110, 109; 370/438

(56) References Cited

U.S. PATENT DOCUMENTS 5,341,131 A * 8/1994 Hoshino et al. ....... 340/825.21
5,819,051 A * 10/1998 Murray et al. ............. 710/107
6,122,694 A * 9/2000 Horiguchi .................. 710/110
6,359,951 B1 * 3/2002 Morriss et al. ............. 375/377

* cited by examiner

*Primary Examiner*—Michael Tokar
*Assistant Examiner*—Vibol Tan
(74) *Attorney, Agent, or Firm*—John R. Ley, LLC (57) ABSTRACT

An order in which bits for serial data are transmitted or received by a first device, integrated circuit (IC) or logic, is programmable to be either from most significant bit (MSB) to least significant bit (LSB) or from LSB to MSB. Therefore, when the first device is used with a second device, integrated circuit (IC) or logic, which can handle the serial data in only one order, the first device is programmed, or configured, to handle the serial data in the same order as the second device.

18 Claims, 6 Drawing Sheets

PROGRAMMABLE BIT ORDERING FOR SERIAL PORT

FIELD

The subject matter herein relates to serial ports that receive and transmit information with a most significant bit (MSB) first or a least significant bit (LSB) first. More specifically, the subject matter herein relates to a serial port that can be programmed, or configured, to handle information that is received and transmitted either MSB first or LSB first.

BACKGROUND

A serial port, or bus, for a computerized system transfers information one bit at a time, rather than several bits at a time, as does a parallel port or bus. A byte (eight bits) of information is thus typically transferred at a rate of one bit per clock cycle (i.e. eight clock cycles) of a supplied clock.

A byte is typically defined by a most significant bit (MSB) and a least significant bit (LSB). When transferred through a serial port, the MSB or LSB of the byte must be transferred first, with the remaining bits following in order.

Figure 1:
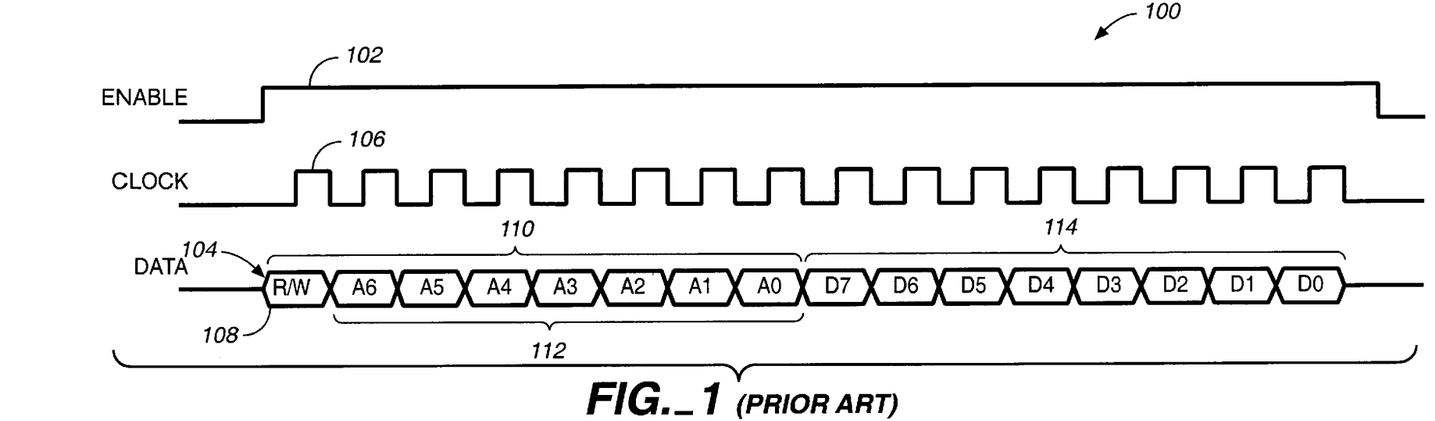
FIG. 1 is a prior art timing diagram for serial data transfer.

An example in which data is transferred MSB first is illustrated by a timing diagram 100 shown in FIG. 1. When serial data transfer is enabled (e.g. by an "enable" signal 102), "data" signals, or bits, 104 are latched on each cycle of a clock signal 106. In a conventional synchronous serial bus transfer, an initial bit (RAW) 108 of a first byte 110 indicates whether the operation is for reading from or writing to a target, such as a memory space or register (not shown) in the serial port (not shown). Subsequent bits 112 of the first byte supply the address of the target, starting with the MSB (A6) and ending with the LSB (A0). For a write operation (e.g. R/W=0), a subsequent byte 114 supplies a byte of the data to be written to the target, starting with the MSB (D7) and ending with the LSB (D0).

Figure 2:
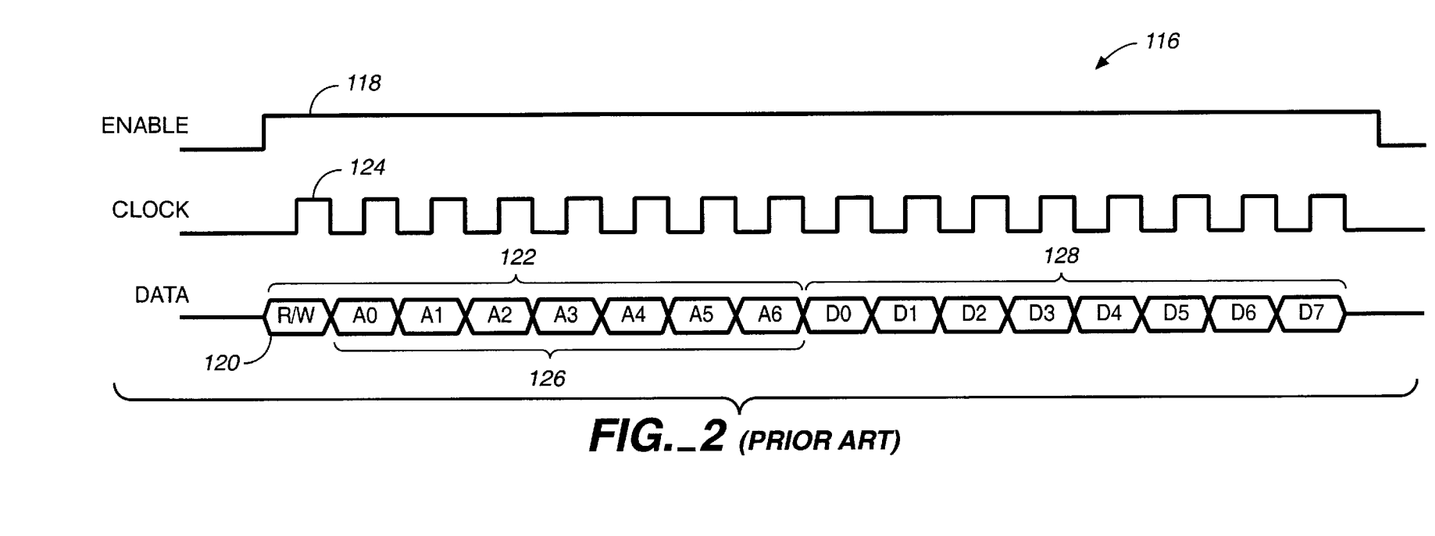
FIG. 2 is an alternative prior art timing diagram for serial data transfer.

An example in which data is transferred LSB first is illustrated by a timing diagram 116 shown in FIG. 2. In this case, when serial data transfer is enabled (e.g. by an "enable" signal 118), and after the initial R/W bit 120 is received in a first bit of a first byte 122 in a first cycle of a clock signal 124, the remaining bits 126 of the first byte 122 supply the address for the target (not shown), starting with the LSB (A0) and ending with the MSB (A6). For a write operation (R/W=0), a subsequent byte 128 supplies a byte of the data, starting with the LSB (D0) and ending with the MSB (D7).

Different hardware (e.g. devices, integrated circuits "IC's" or logic), that receive and transmit information in serial, however, do not all transmit the bits in the same order (i.e. MSB first or LSB first). When two or more IC's that do not transmit the bits in the same order are to be used together, one of the IC's must be redesigned to be compatible with the other IC. A redesign is typically costly and time-consuming.

It is with respect to these and other background considerations that the subject matter herein has evolved.

SUMMARY

The subject matter described herein involves a device, integrated circuit (IC) or logic, for use in serial data transfer, that can be configured, or programmed, to handle data in either an MSB first or LSB first operational mode, so it can be used with any other circuitry without having to redesign the IC or the other circuitry, regardless of the order in which the IC and the other circuitry handle the data. A controller, such as, but not necessarily, a type that operates on software or firmware, sends a command to the IC instructing the IC on the mode (i.e. MSB or LSB first) with which to handle the serial data.

In a particular embodiment, the command has a "mirrored" bit pattern, meaning that the bits of the command are the same whether received MSB first or LSB first. The command may further involve a mirrored bit pattern for a reserved address (e.g. for a register) in the IC to which another particular mirrored bit pattern is written to cause the IC to use the desired operational mode.

In another particular embodiment, one of the operational modes (i.e. MSB first or LSB first) is a default, so the command is sent only if the other operational mode is required. In this manner, configuration of the IC is simplified.

In another particular embodiment, a device in which the IC is incorporated has more than one such IC, each connected to some other circuitry. Some of the IC's may have to operate MSB first, and the rest of the IC's may have to operate LSB first, depending on the operational mode of the other circuitry connected to each IC. Thus, the controller sends commands to each such IC separately instructing them on the operational mode that they are to use.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

DETAILED DESCRIPTION

Figure 3:
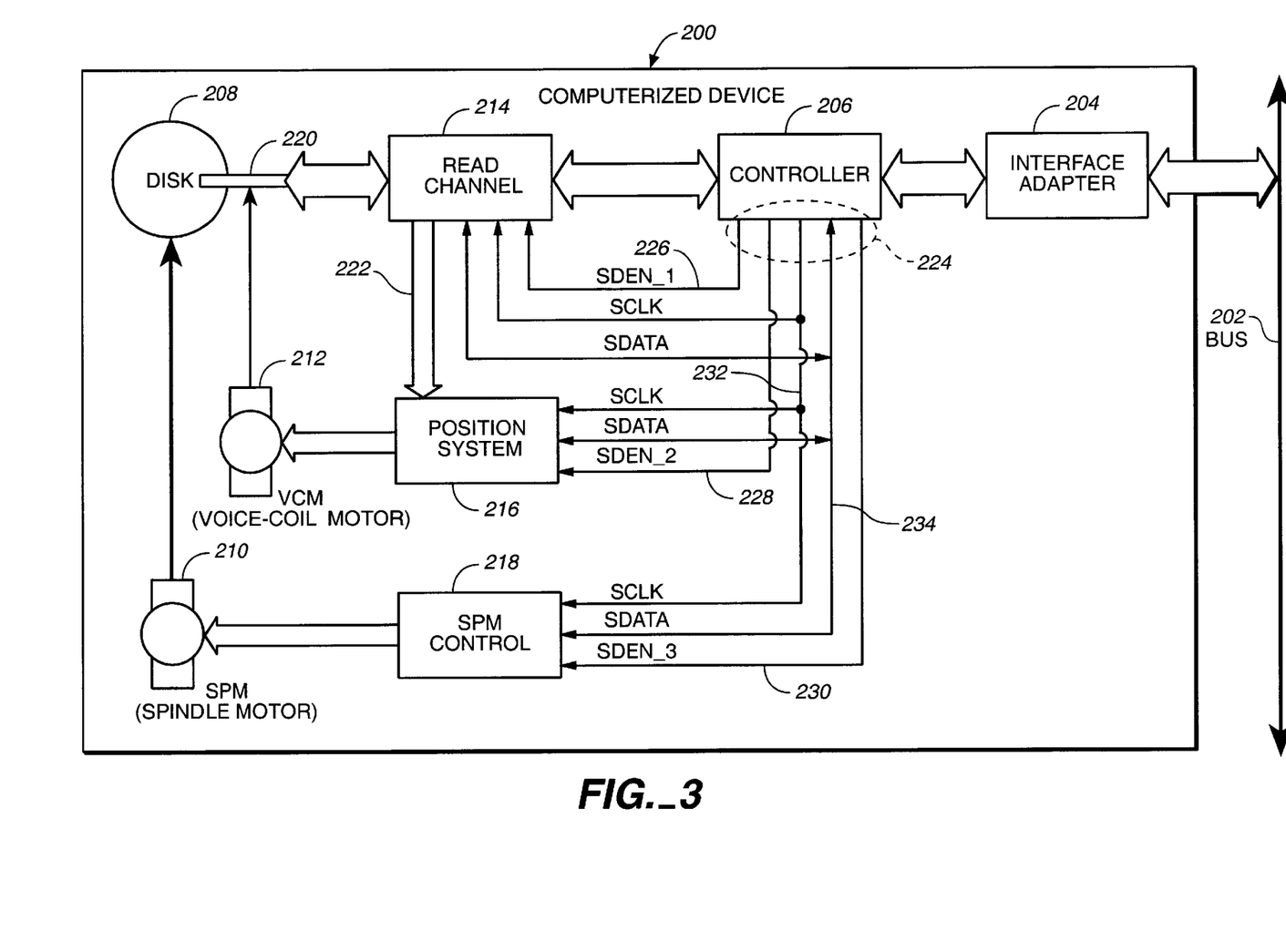
FIG. 3 is a block diagram of a device connected to a bus.

A computerized device 200, as shown in FIG. 3, such as a storage device, network interface or other computerized device, connects to other devices (not shown) through a bus 202. The computerized device 200 generally includes a conventional interface adapter 204 for exchanging signals with the bus 202 and a controller 206, such as a conventional microprocessor, for controlling the overall operation of the computerized device 200. In the case of a storage device, such as a hard drive, the computerized device 200 also generally includes a conventional storage disk 208, a conventional spindle motor 210, a conventional voice-coil motor 212, a read channel logic 214, a position system logic 216 and a spindle motor control logic 218. The storage disk 208 contains the information stored by the storage device (the computerized device 200). The spindle motor 210 spins the storage disk 208, so a read/write head 220 can read and write the information from and to the storage disk 208. The voice-coil motor 210 controls the position of the read/write head 220 over the storage disk 208, so the read/write head 220 can access the correct location on the storage disk 208. The read channel logic 214 exchanges the information between the read/write head 220 and the controller 206, which further exchanges the information with the interface adapter 204 and then with the bus 202. The position system logic 216, in response to disk address signals 222 received from the read channel logic 214, controls the voice-coil motor 212 to position the read/write head 220. The spindle control logic 218 controls the spindle motor 210 to spin the storage disk 208.

Each of the controller 206, the read channel logic 214, the position system logic 216 and the spindle control logic 218 are typically separate integrated circuits (IC's) on a printed circuit board (not shown). Additionally, the controller 206 typically sends control signals to and exchanges data signals with the other IC's 214, 216 and 218 to control and configure the operation of the other IC's 214, 216 and 218. To save on the number of pins used by the IC's 206, 214, 216 and 218, the IC's 206, 214, 216 and 218 preferably use a synchronous serial bus 224 for exchanging these signals. Thus, the IC's 206, 214, 216 and 218 are also "serial ports" that exchange serial signals, which generally include serial enable signals (SDEN_1, SDEN_2 and SDEN_3) 226, 228 and 230, a serial clock signal (SCLK) 232 and a serial data signal (SDATA) 234.

The enable signals (SDEN_1, SDEN_2 and SDEN_3) 226, 228 and 230, one for each of the other IC's 214, 216 and 218, respectively, are used by the controller 206 to select one of the other IC's 214, 216 and 218 with which to communicate. After establishing a connection with a selected one of the other IC's 214, 216 or 218 by activating the appropriate enable signal (SDEN_1, SDEN_2 or SDEN_3) 226, 228 or 230, the controller exchanges information through the data signal (SDATA) 234 with the selected other IC 214, 216 or 218. Typically, one bit of the information is exchanged on each cycle of the clock signal (SCLK) 232. The information thus serially exchanged between the controller 206 and the other IC's 214, 216 and 218 is typically used to write configure information into registers (shown below) for setting up the operation of the other IC's 214, 216 and 218.

Each of the IC's 206, 214, 216 and 218 may be supplied by different vendors, or different divisions within the same vendor, which may not all handle serial information in the same manner. In other words, some of the IC's 206, 214, 216 and 218 may transmit the serial information in an order, or "operational mode," that proceeds with the most significant bit (MSB) of each byte of information first, while others of the IC's 206, 214, 216 and 218 may transmit the serial information in the opposite order, i.e. with the least significant bit (LSB) of each byte first. Therefore, in each group of IC's (e.g. 206/214, 206/216 and 206/218) that communicate together serially, at least one of the IC's 206, 214, 216 and 218 in each group preferably includes a programmability, described herein, to handle the serial information in either order, or operational mode. Since it is the controller 206 that generally controls the operation of the rest of the computerized device 200, it is preferable to establish configure commands that are issued from the controller 206 to the other IC's 214, 216 and 218 for programming the other IC's 214, 216 and 218 to handle the serial data in the same order as the controller 206. Additionally, in order for the controller 206 and the other IC's 214, 216 and 218 to handle the serial information for the configure commands before the other IC's 214, 216 and 218 have been properly programmed, it is preferable for the bits of the configure commands to have a "mirrored" pattern. In other words, the serial information for the configure commands preferably has a bit pattern that is the same whether transferred MSB first or LSB first.

Figure 4:
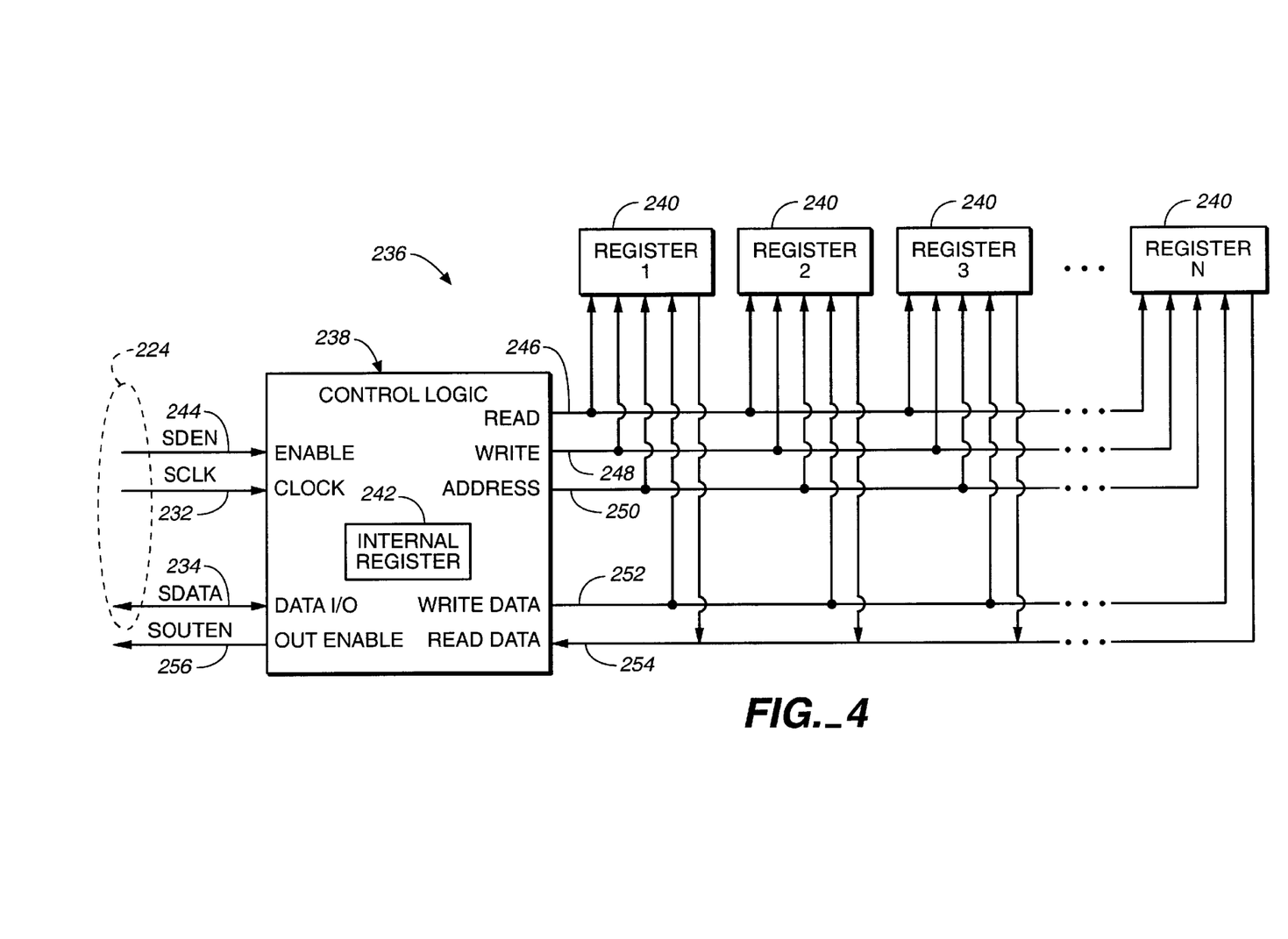
FIG. 4 is a block diagram of a serial port incorporated in the device shown in FIG. 3.

An exemplary serial port 236, similar to the other IC's 214, 216 and 218, generally includes a control logic 238 and one or more conventional registers 240, as shown in FIG. 4. The registers 240 typically are internal registers of the serial port 236 into which the controller 206 (FIG. 3) writes configuration information to set up and control the operation of other components (not shown) of the serial port 236. The configure command for programming the operational mode (e.g. MSB first or LSB first) of the serial port 236 may be written to one of the registers 240 or to another register, or latch, 242 (described below) that is internal to the control logic 238. The register 240 or 242 into which the configure command is written preferably has an address within the serial port 236 that has a mirrored bit pattern, so that the controller 206 can write to this register 240 or 242 regardless of the operational mode used by the serial port 236 prior to being programmed for the desired operational mode. Alternatively, instead of actually writing the configure command to one of the registers 240 or 242, the control logic 238 may decode the desired address, which, when followed by the configure command, causes a bit to be set in the control logic 238 indicating the operational mode for the serial port 236.

The control logic 238 receives the signals of the synchronous serial bus 224, including the clock signal (SCLK) 232, the data signal (SDATA) 234 and a serial enable signal (SDEN) 244, such as the enable signals (SDEN_1, SDEN_2 or SDEN_3) 226, 228 or 230 (FIG. 3). The clock signal (SCLK) 232, the data signal (SDATA) 234 and the enable signal (SDEN) 242 are also similar to the "clock" signals, the "data" signals and the "enable" signals shown in FIGS. 1 and 2. Thus, when the enable signal (SDEN) 232 is asserted, the first bit of the data signal (SDATA) 234 on the first cycle of the clock signal (SCLK) 232 indicates whether the current operation is a read or write operation. The next seven bits of the data signal (SDATA) 234 form the address of the desired register 240 or 242. If the current operation is a write operation, then the next eight bits of the data signal (SDATA) 234 form the serial data to be written to the desired register 240 or 242.

If the current operation is a read operation, as indicated by the first bit of the data signal (SDATA) 234, then a "read" signal 246 is sent to the registers 240 and 242. On the other hand, if the current operation is a write operation, then a "write" signal 248 is sent to the registers 240 and 242. The next seven bits of the data signal (SDATA) 234 are then de-serialized by the control logic 238 into a seven-bit-wide parallel "address" signal 250, which is sent to the registers 240 and 242. If the current operation is a write operation, then the next eight bits of the data signal (SDATA) 234 are de-serialized by the control logic 238 into an eight-bit-wide parallel "write data" signal 252, which is sent to the registers 240 and 242. The write signal 248 thus causes the register 240 or 242 specified by the address signal 250 to latch, or store, the write data signal 252. If the current operation is a read operation, on the other hand, then the read signal 246 causes the register 240 specified by the address signal 250 to produce the current contents thereof onto an eight-bit-wide parallel "read data" signal 254. On the next eight cycles of the clock signal (SCLK) 232, the read data signal 254 is serialized by the control logic 238 and output as the data signal (SDATA) 234. Additionally, if the current operation is a read operation, then the control logic 238 produces a serial "out enable" signal (SOUTEN) 256 indicating to the controller 206 (FIG. 3) to receive the serialized output data signal (SDATA) 234.

Figure 5:
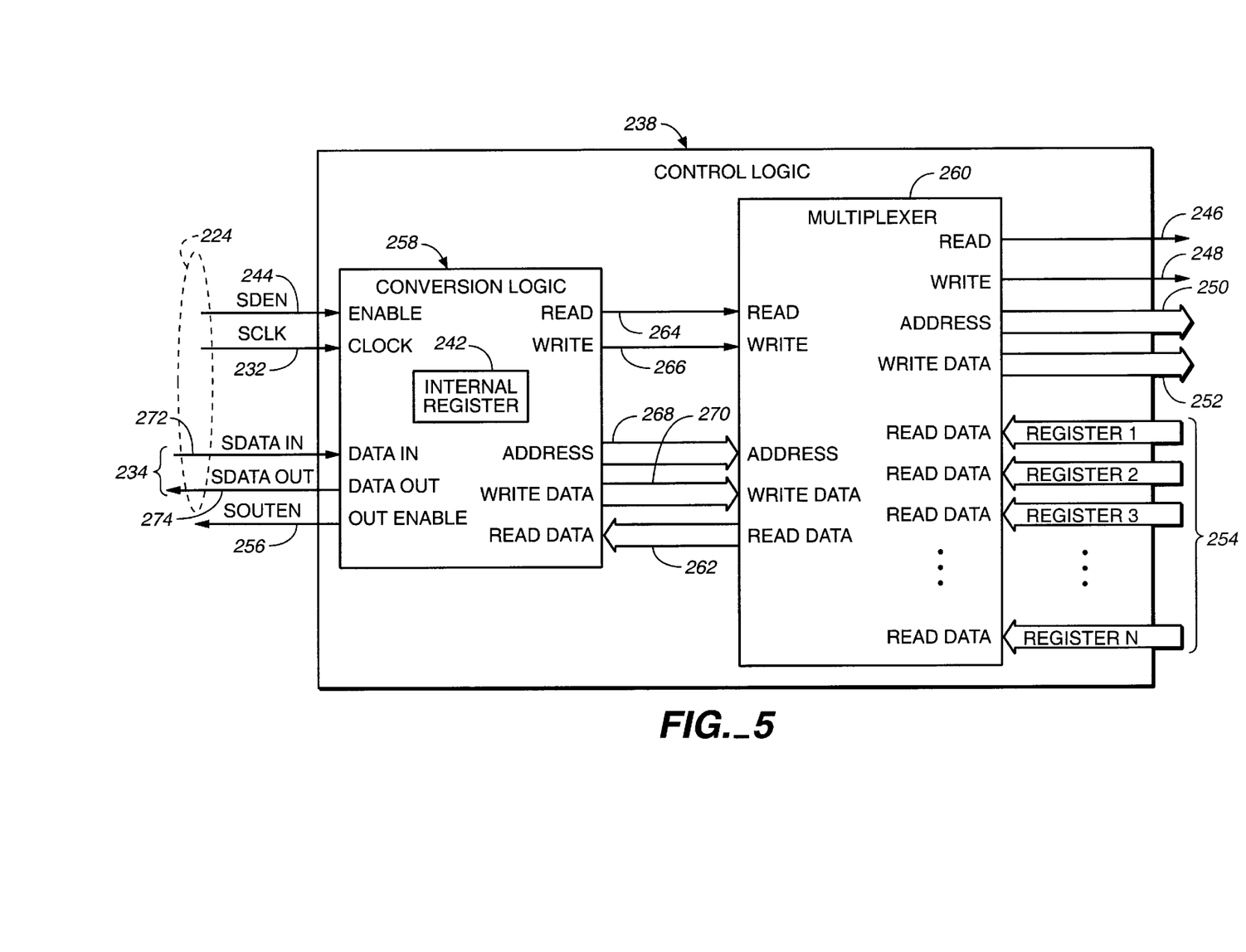
FIG. 5 is a block diagram of control logic incorporated in the serial port shown in FIG. 4.

The control logic 238 generally includes a conversion logic 258 and a multiplexer 260, as shown in FIG. 5. The multiplexer 260 includes a conventional multiplexing function for selecting one of the parallel read data signals 254 from the registers 240 (FIG. 4) to be supplied as an internal parallel read data signal 262 to the conversion logic 258. The read signal 246, the write signal 248, the parallel address signal 250 and the parallel write data signal 252 essentially "pass through" the multiplexer 260 from corresponding internal signals 264, 266, 268 and 270 generated by the conversion logic 258.

The conversion logic 258 receives the serial signals of the synchronous serial bus 224 to generate the internal signals 264–270. The internal read and write signals 264 and 266, for example, are generated from the first bit of the input portion (SDATA IN) 272 of the serial data signal 234 (SDATA, FIGS. 3 and 4). The internal parallel address signal 268 is generated by deserializing the next seven bits of the input serial data signal (SDATA IN) 272. For a write operation, the internal parallel write data signal 270 is generated by deserializing the next byte (eight bits) of the input serial data signal (SDATA IN) 272. For a read operation, the internal parallel read data signal 262 is serialized by the conversion logic 258 into an output portion (SDATA OUT) 274 of the serial data signal 234. Likewise, for a read operation, the conversion logic 258 generates the serial "out enable" signal (SOUTEN) 256.

The internal register, or latch, 242 into which the configure command may be written may preferably be included in the conversion logic 258. Thus, upon decoding the appropriate address, the configure command is written into the internal register 242 (or alternatively a bit is set in the conversion logic 258) indicating the operational mode (MSB first or LSB first) for the serial port 236 (FIG. 4).

Figure 6:
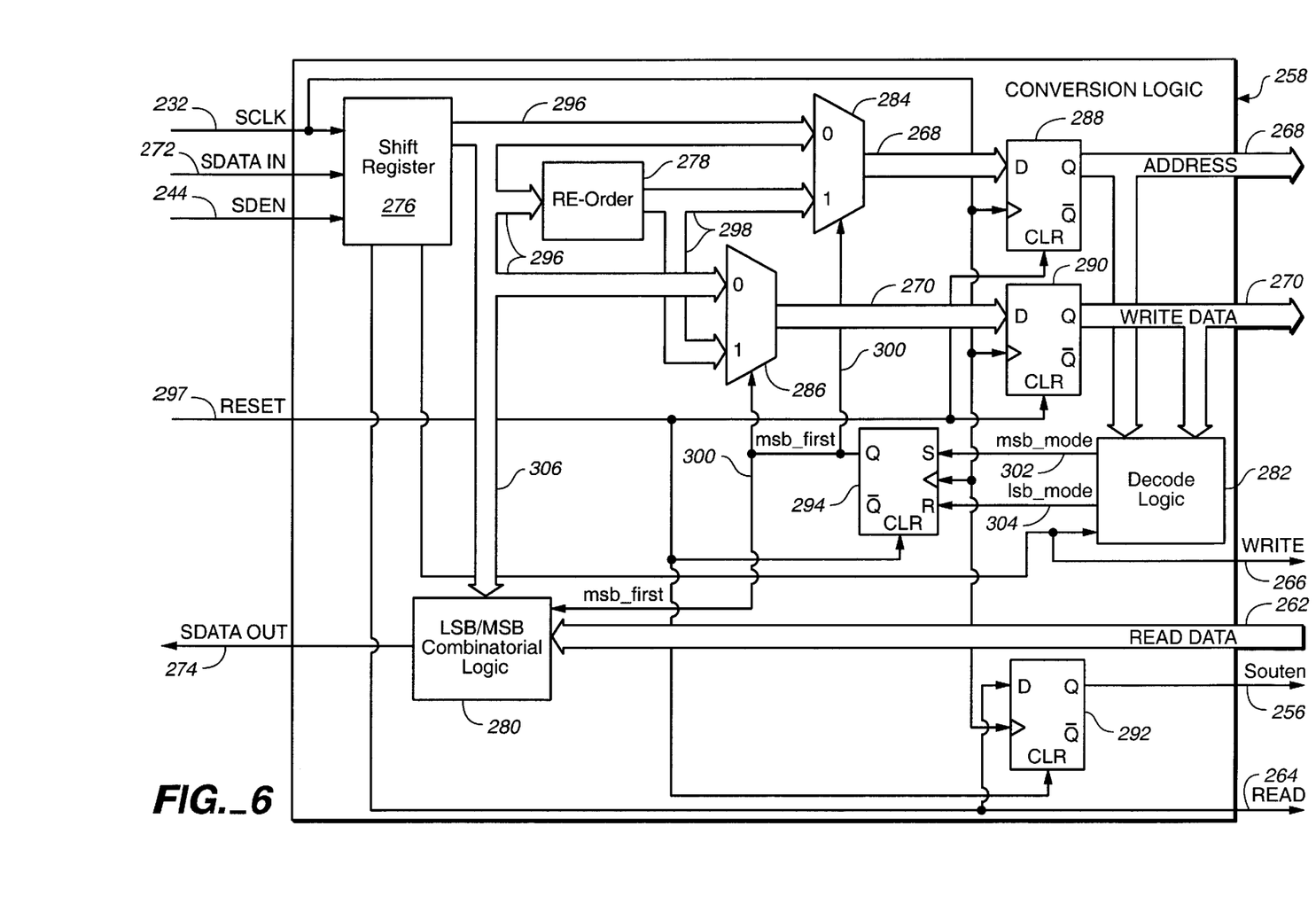
FIG. 6 is a block diagram of conversion logic incorporated in the control logic shown in FIG. 5.

The conversion logic 258, as shown in FIG. 6, generally includes a shift register 276, a re-order logic 278, an LSB/MSB combinatorial logic 280, a decode logic 282, conventional multiplexers 284 and 286, conventional D flip-flops 288, 290 and 292 and a conventional S/R flip-flop 294. The shift register 276 deserializes the input serial data signal (SDATA IN) 272 into internal parallel data 296 in response to the serial enable signal (SDEN) 244 and the clock signal (SCLK) 232. The clock signal (SCLK) 232 also clocks the operation of the flip-flops 288, 290, 292 and 294. The flip-flops 288, 290, 292 and 294 are also cleared by a reset signal 297 when necessary to reset the conversion logic 258 and the serial port 236 (FIG. 4).

The re-order logic 278 reorders (i.e. reverses the bit order of) the internal parallel data 296 into reordered internal parallel data 298. The address portions of the internal parallel data 296 and the reordered internal parallel data 298 are supplied to the multiplexer 284. For a write operation, the data portions of the internal parallel data 296 and the reordered internal parallel data 298 are supplied to the multiplexer 286. The multiplexers 284 and 286 select between the internal parallel data 296 and the reordered internal parallel data 298, depending on the operational mode (MSB first or LSB first) of the serial port 236 (FIG. 4) as specified by a MSB_first bit 300 (described below), to produce the appropriate internal parallel address signal 268 and the appropriate internal parallel write data signal 270, respectively. The D flip-flops 288 and 290 latch the internal parallel address signal 268 and the internal parallel write data signal 270, respectively, which are supplied by the conversion logic 258 to the decode logic 282 and the multiplexer 260 (FIG. 5).

When the first bit of the input serial data signal (SDATA IN) 272 indicates that the current operation is a write operation, the shift register 276 generates the internal write signal 266, which is supplied to the decode logic 282 and the multiplexer 260 (FIG. 5). On the other hand, when the first bit of the input serial data signal (SDATA IN) 272 indicates that the current operation is a read operation, the shift register 276 generates the internal read signal 264, which is supplied to the D flip-flop 292 and the multiplexer 260. The D flip-flop 292 latches the internal read signal 264 to generate the serial "out enable" signal (SOUTEN) 256.

Upon receiving the internal write signal 266, the decode logic 282 decodes the internal parallel address signal 268 to determine whether it is the mirrored-bit-pattern address to which the configure command is written. If so, the decode logic 282 decodes the internal parallel write data signal 270 to determine whether it is the mirrored-bit-pattern configure command indicating the operational mode (MSB first or LSB first) for the serial port 236 (FIG. 4). Depending on the operational mode indicated by the configure command, the decode logic 282 supplies either a MSB_mode signal 302 or a LSB_mode signal 304 to the S/R flip-flop 294. Alternatively, if one of the operational modes (e.g. LSB first) is a default mode, then the decode logic 282 supplies the signal (e.g. LSB_mode signal 304) associated therewith to the R input of the S/R flip-flop 294 whenever no configure command has been received.

When the MSB_mode signal 302 is supplied to the S input of the S/R flip-flop 294, the S/R flip-flop 294 asserts the MSB_first bit 300 to place the serial port 236 (FIG. 4) into the MSB first operational mode. Otherwise, the S/R flip-flop 294 deasserts the MSB_first bit 300 to place the serial port 236 into the LSB first operational mode. The MSB_first bit 300 is thus the bit that is set or reset for the appropriate operational mode.

In addition to the multiplexers 284 and 286, which use the MSB_first bit 300 to produce the internal parallel address signal 268 and the internal parallel write data signal 270 in the appropriate operational mode, the LSB/MSB combinatorial logic 280 also receives the MSB_first bit 300 to select the proper operational mode in which to serialize the internal parallel read data signal 262 into the output serial data signal (SDATA OUT) 274. Additionally, during a read operation, the shift register 276 supplies a shift signal 306 to the LSB/MSB combinatorial logic 280 with which the LSB/MSB combinatorial logic 280 forms the output serial data signal (SDATA OUT) 274. The shift signal 306 essentially involves a byte containing all logical zeroes, except for one logical one value that shifts from the MSB of the byte to the LSB.

Figure 7:
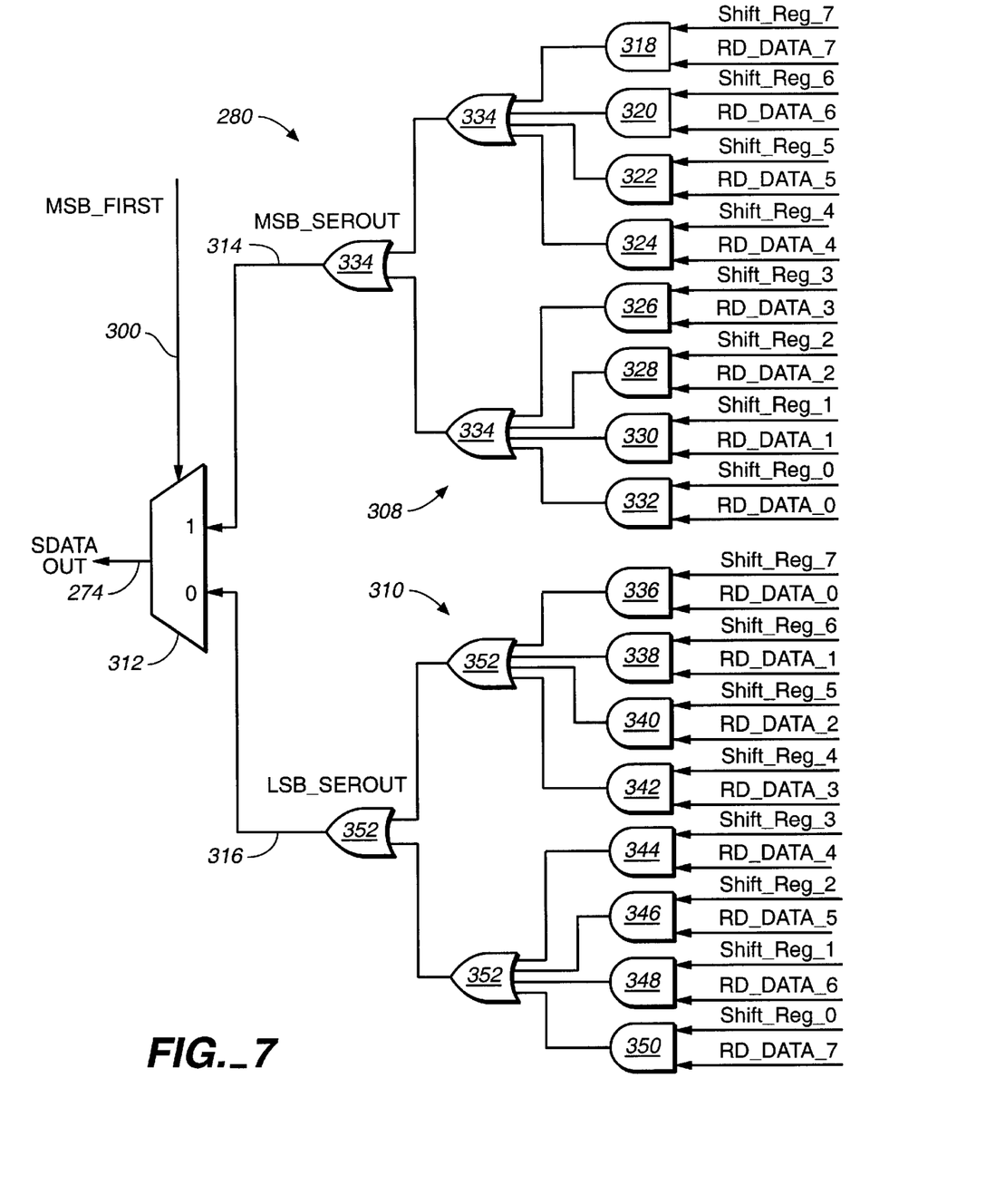
FIG. 7 is a block diagram of combinatorial logic incorporated in the conversion logic shown in FIG. 6.

The LSB/MSB combinatorial logic 280, as shown in FIG. 7, generally includes an MSB combinatorial logic 308, an LSB combinatorial logic 310 and a multiplexer 312. The MSB combinatorial logic 308 combines the shift signal 306 (FIG. 6) and the internal parallel read data signal 262 (FIG. 6) to form an MSB_SEROUT signal 314, which is essentially the output serial data signal (SDATA OUT) 274 in the MSB first operational mode. On the other hand, the LSB combinatorial logic 310 combines the shift signal 306 and the internal parallel read data signal 262 to form an LSB_SEROUT signal 316, which is essentially the output serial data signal (SDATA OUT) 274 in the LSB first operational mode. The multiplexer 312 selects between the MSB_SEROUT signal 314 and the LSB_SEROUT signal 316 to produce the output serial data signal (SDATA OUT) 274, depending on the value of the MSB_first bit 300.

The shift signal 306 (FIG. 6) generally includes eight shift register bits (shift_reg_0 to shift_reg_7). Likewise the internal parallel read data signal 262 (FIG. 6) generally includes eight read data bits (rd_data_0 to rd_data_7). The read data bits (rd_data_0 to rd_data_7) have logical values to form a byte of the data being read from one of the registers 240 (FIG. 4), which must be maintained on the read data bits (rd_data_0 to rd_data_7) until the entire byte has been serialized. The shift register bits (shift_reg_0 to shift_reg_7), on the other hand, have all logical zero values, except for one logical one value, which shifts one bit per clock cycle (of the clock signal SCLK 232) from the shift register bit shift_reg_7 to the shift register bit shift_reg_0.

The MSB combinatorial logic 308 pairs the shift register bits (shift reg 0 to shift reg 7) and read data bits (rd data_0 to rd_data_7) using AND gates 318–332 (from shift_reg 0 paired with rd_data_0 by AND gate 332 to shift_reg 7 paired with rd_data 7 by AND gate 318). The outputs of the AND gates 318–332 are ORed together through OR gates 334. Therefore, as the logical one value in the shift register bits (shift_reg_0 to shift_reg_7) shifts from the shift register bit shift reg_7 to the shift register bit shift reg_0, the output of the OR gates 334 (the MSB_SEROUT signal 314) steps through the logical values of each of the read data bits (rd data_0 to rd_data 7) from rd_data_7 to rd_data_0. In other words, the OR gates 334 output the byte of data being read from the registers 240 (FIG. 4) from the MSB (rd_data_7) to the LSB (rd_data_0).

The LSB combinatorial logic 310 pairs the shift register bits (shift_reg_0 to shift_reg_7) and read data bits (rd_data_0 to rd_data_7) using AND gates 336–350 (from shift_reg_0 paired with rd_data_7 by AND gate 350 to shift_reg_7 paired with rd_data_0 by AND gate 336). The outputs of the AND gates 336–350 are ORed together through OR gates 352. Therefore, as the logical one value in the shift register bits (shift_reg_0 to shift_reg_7) shifts from the shift register bit shift_reg_7 to the shift register bit shift_reg_0, the output of the OR gates 352 (the LSB_SEROUT signal 316) steps through the logical values of each of the read data bits (rd_data_0 to rd_data_7) from rd_data_0 to rd_data_7. In other words, the OR gates 352 output the byte of data being read from the registers 240 (FIG. 4) from the LSB (rd_data_0) to the MSB (rd_data_7).

The subject matter described herein has the advantage of being able to handle serial data in either the MSB first operational mode or the LSB first operational mode, whether writing or reading the serial data. Thus, an IC that incorporates the subject matter herein can serially communicate with another IC that is fixed in its operational mode, without having to redesign either IC. Additionally, the mirrored bit patterns of the configure command and the target address for the configure command enable the IC that incorporates the subject matter herein to be programmed for the proper operational mode through the use of the same serial data, regardless of the initial operational mode of either IC.

Presently preferred embodiments of the subject matter herein and its improvements have been described with a degree of particularity. This description has been made by way of preferred example. It should be understood that the scope of the claimed subject matter is defined by the following claims, and should not be unnecessarily limited by the detailed description of the preferred embodiments set forth above.

What is claimed is:

1. A method for handling serial data between first and second circuits comprising:
    providing the first circuit programmable to handle the serial data in a first operational mode and in a second operational mode, in the first operational mode the serial data is transferred between the first and second circuits in a first order and in the second operational mode the serial data is transferred between the first and second circuits in a second order;
    providing the second circuit connected to the first circuit and capable of handling the serial data in a predetermined operational mode, the predetermined operational mode being one of the first and second operational modes;
    determining the predetermined operational mode in which the second circuit handles the serial data; and
    programming the first circuit to handle the serial data in the predetermined operational mode.

2. The method as defined in claim 1 further comprising:
    when transferring the serial data in the first order, transferring the serial data with a most significant bit first; and
    when transferring the serial data in the second order, transferring the serial data with a least significant bit first.

3. The method as defined in claim 1, wherein the first and second circuits are controlled by a controller, further comprising:
    sending a configure command from the controller to the first circuit instructing the first circuit to program the first circuit to handle the serial data in the predetermined operational mode.

4. The method as defined in claim 3 further comprising:
    sending the configure command with a mirrored bit pattern.

5. The method as defined in claim 3 further comprising:
    sending the configure command to a location within the first circuit having an address with a mirrored bit pattern.

6. The method as defined in claim 5, wherein the mirrored bit pattern is a first mirrored bit pattern, further comprising:
    sending the configure command with a second mirrored bit pattern.

7. The method as defined in claim 1, wherein the first operational mode is a default operational mode, further comprising:
    programming the first circuit to handle the serial data in the predetermined operational mode only if the predetermined operational mode is the second operational mode.

8. The method as defined in claim 1 further comprising:
    providing a plurality of the first circuits, each programmable to handle the serial data in the first operational mode and in the second operational mode; and
    providing a plurality of the second circuits, each connected to one of the first circuits, the predetermined operational mode for each second circuit being one of the first and second operational modes;
    and for each first and second circuit connected together:
        determining the predetermined operational mode in which the second circuit handles the serial data; and programming the first circuit to handle the serial data in the predetermined operational mode.

9. The method as defined in claim 8, wherein the plurality of the first and second circuits are controlled by a controller, further comprising:

sending a configure command from the controller to each first circuit instructing the first circuit to program the first circuit to handle the serial data in the predetermined operational mode for the second circuit connected thereto.

10. A serial port for connecting to and transferring information between a first circuit and a second circuit and that handles the information as serial data when transferred to and from the first circuit and as parallel data when transferred to and from the second circuit, and the first circuit is capable of handling the serial data only in a predetermined operational mode, comprising:

first logic connected to the second circuit to receive the parallel data therefrom, the first logic converts the parallel data into the serial data for transfer of the serial data to the first circuit in a first operational mode in which the serial data is transferred in a first order;

second logic connected to the second circuit to receive the parallel data therefrom, the second logic converts the parallel data into the serial data for transfer of the serial data to the first circuit in a second operational mode in which the serial data is transferred in a second order, the predetermined operational mode being one of the first and second operational modes; and selection logic connected to the first and second logic for selecting between the first logic and the second logic for transferring the serial data to the first circuit in the predetermined operational mode.

11. The serial port as defined in claim 10 wherein:

the first logic converts the parallel data into the serial data with a most significant bit of the parallel data transferred first to the first circuit; and the second logic converts the parallel data into the serial data with a least significant bit of the parallel data transferred first to the first circuit.

12. The serial port as defined in claim 10 also for connecting to a controller, wherein:

the controller sends a configure command to the serial port instructing the serial port to handle the serial data in the predetermined operational mode; and the selection logic selects one of the first and second logic in response to the configure command to handle the serial data in the predetermined operational mode.

13. The serial port as defined in claim 12 wherein the configure command includes a mirrored bit pattern.

14. The serial port as defined in claim 12 wherein:

the configure command includes an address which specifies a location within the first circuit; and the address includes a mirrored bit pattern.

15. The serial port as defined in claim 14 wherein:

the mirrored bit pattern is a first mirrored bit pattern; and the configure command includes a second mirrored bit pattern which is stored in the location specified by the address.

16. The serial port as defined in claim 10 also for connecting to a controller, wherein:

the first operational mode is a default operational mode;

the controller sends a configure command to the serial port instructing the serial port to handle the serial data in the predetermined operational mode only if the predetermined operational mode is the second operational mode; and the selection logic selects the first logic when the configure command is not sent and selects the second logic in response to the configure command.

17. A device within which information is handled as parallel data and as serial data comprising:

a plurality of first circuits, each handling the serial data only in a predetermined operational mode;

a plurality of second circuits, each handling at least a portion of the parallel data; and a plurality of serial ports, each connecting to and transferring the information between one of the first circuits and one of the second circuits and handling the information as the serial data when transferred to and from the first circuit and as the parallel data when transferred to and from the second circuit, each serial port comprising:

first logic connected to the one second circuit to receive the parallel data therefrom, the first logic converts the parallel data into the serial data for transfer of the serial data to the one first circuit in a first operational mode in which the serial data is transferred in a first order;

second logic connected to the one second circuit to receive the parallel data therefrom, the second logic converts the parallel data into the serial data for transfer of the serial data to the one first circuit in a second operational mode in which the serial data is transferred in a second order, the predetermined operational mode of the one first circuit connected to the serial port being one of the first and second operational modes; and selection logic connected to the first and second logic for selecting between the first logic and the second logic for transferring the serial data to the one first circuit in the predetermined operational mode of the one first circuit.

18. The serial device as defined in claim 17 further comprising:

a controller connected to the serial ports to send a configure command to each serial port instructing the selection logic of the serial port to select one of the first and second logic of the serial port to convert the parallel data into the serial data in the predetermined operational mode of the first circuit connected to the serial port.

* * * * *